Sheet 1-3 Sheets

A. Schwitter,

Engraving Machine.

No. 2,546. Reissued Apr. 9, 1867.

Witnesses
Wm. P. McNamara
Jas. P. Hall.

Inventor
Anton Schwitter

AM. PHOTO-LITHO. CO. N.Y. (OSBORNE'S PROCESS)

Sheet 2-3 Sheets.

A. Schwitter,

Engraving Machine,

No. 2,546. Reissued Apr. 9, 1867.

Witnesses

Wm. J. McNamara

Jas P Hall.

Inventor

Anton Schwitter

AM. PHOTO-LITHO. CO. N.Y. (OSBORNE'S PROCESS)

Sheet 3-3 Sheets

A. Schwitter,

Engraving Machine,

No. 2,546. Reissued Apr. 9, 1867.

Witnesses

Wm. F. McNamara

Jas P. Hall.

Inventor

Anton Schwitter

AM. PHOTO-LITHO. CO. N.Y. (OSBORNE'S PROCESS)

United States Patent Office.

ANTON SCHWITTER, OF NEW YORK, N. Y.

*Letters Patent No.* 44,461, *dated September* 27, 1864; *reissue No.* 2,546, *dated April* 9, 1867.

IMPROVEMENT IN ORNAMENTING ARTICLES OF GLASS OR OTHER VITREOUS MATERIALS.

The Schedule referred to in these Letters Patent and making part of the same.

TO ALL WHOM IT MAY CONCERN:

Be it known that I, ANTON SCHWITTER, of 182 Fulton street, in the city, county, and State of New York, have invented a new and useful Improvement in Ornamenting Articles of Glass or Other Vitreous Material; and I hereby declare that the following is a full, clear, and exact description thereof, which will enable those skilled in the art to make and use the same, reference being had to the accompanying drawing forming part of this specification, in which drawing—

Similar letters of reference indicate corresponding parts.

This invention consists in giving to the cutter used in ornamenting articles of glass or other vitreous material a motion towards and from the work by hand at the will of the operator, while the work is secured to a movable spindle or carriage in such a manner that the operator is enabled to produce lines or marks of uniform or of variable thickness, while the motion imparted to the work by the mechanism insures perfect regularity of said lines or marks. The tool used in this operation has a rotary motion besides the motion which is imparted to it by the hand of the operator, and it is secured in suitable tool-bearer, which is so constructed that it allows of imparting to the tool all the requisite motions.

Figure 1:
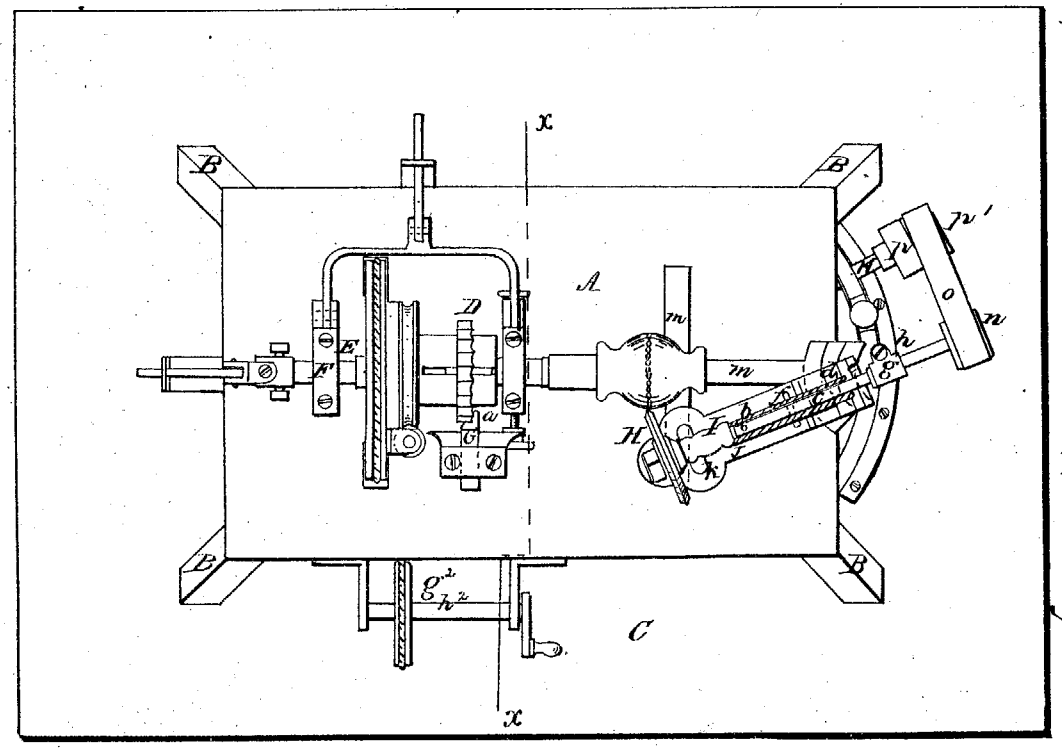
Figure 1 represents a plan or top view of the mechanism which may be used in carrying out this invention, partly in section.
Figure 2:
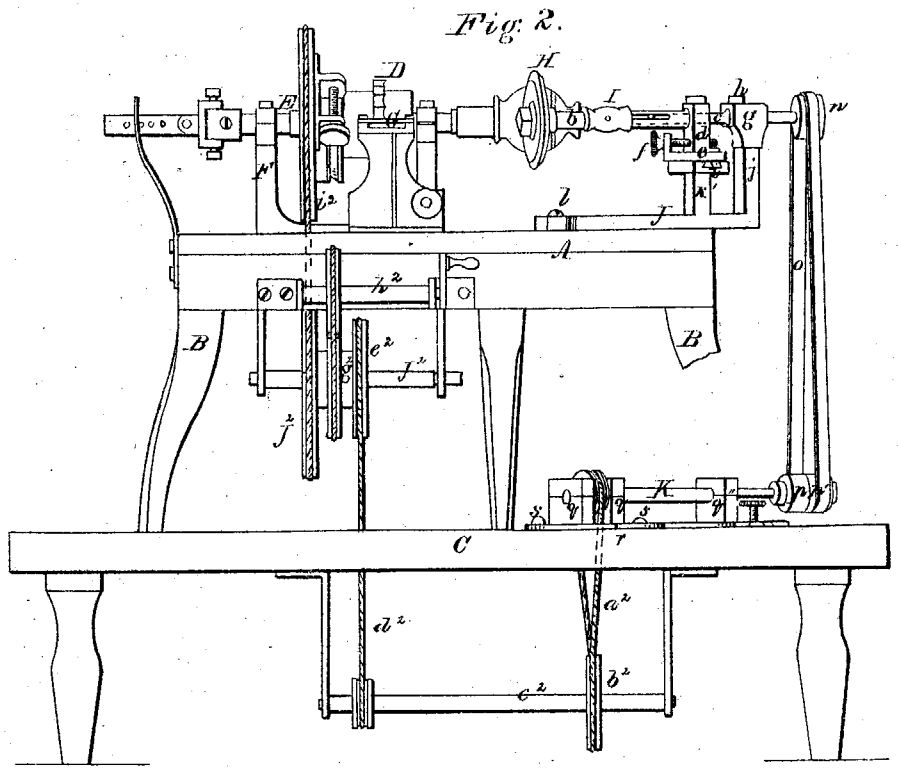
Figure 2 is a side elevation of the same.
Figure 3:
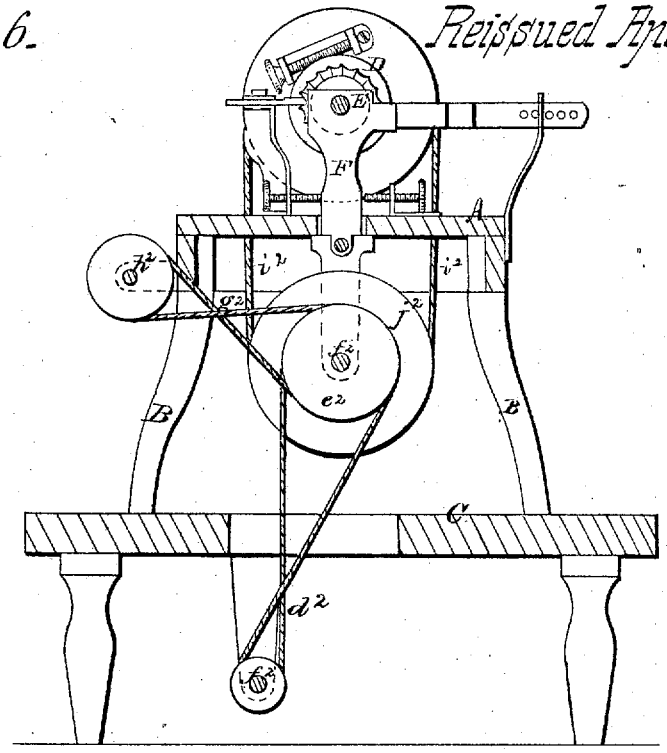
Figure 3 is a transverse vertical section of the same, taken in the plane indicated by the line *x x*, fig. 1.
Figure 4:
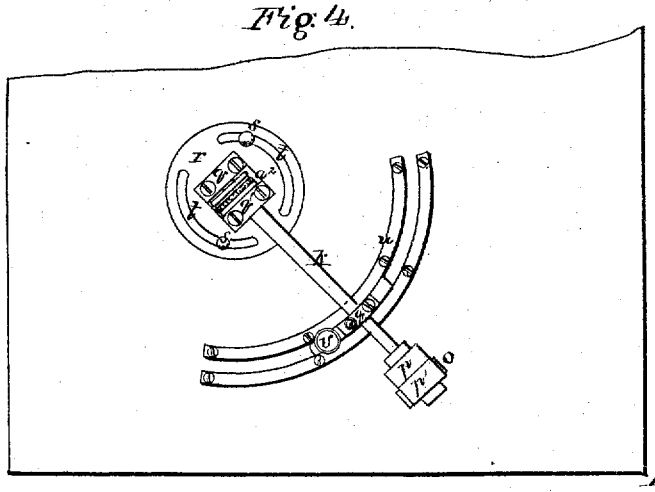
Figure 4 is a partial plan of the mechanism necessary to impart motion to the rotating cutter.

The mechanism which is represented in the drawing, and which may be used advantageously in carrying out my invention, is an ordinary engine turning machine or rose engine, the working parts of which are supported by a table or platform, A, and which rests upon legs, B, at a convenient height for the operator, who is to stand on the floor C. The spindle E of said rose engine has its bearings in a frame, F, which has a transverse oscillating motion on the table, and this oscillating motion of the frame, as well as the longitudinal motion of the spindle, is governed by the action of a rosette, D, and guide, G; or, if desired, the frame may be made stationary, and the spindle so arranged that it has only a revolving motion, and in this case a chuck is attached to said spindle, which is provided with a diagonally-moving carriage, so that a revolving and also a rectilinear motion can be imparted to the work secured to said chuck. After the article to be ornamented has been secured to the spindle or chuck, it is exposed to the action of a rotating cutter or tool, H. This tool may be made of a composition of emery with liquid silex or any other suitable material, or it may be made of steel or any other material, according to the nature of the surface on which the ornamentation is to be produced. For the purpose of cutting lines into the surface of an article of glass an emery-wheel is the best, and this wheel or tool is secured to a spindle, I, which is composed of two parts, *b c*, one sliding within the other. The tubular shaft *b* carries on one end the tool H, and its other end has its bearing in a head, *d*, to which a longitudinally sliding motion can be imparted in the guide-ways *e* by means of a set-screw, *f*, or in any other suitable manner. The solid part *c* of the spindle T has its bearing in a swivel head, *g*, which turns on a pivot, *h*, and it (the part *c*) extends into the tube *b* nearly to its extreme end, as clearly shown in fig. 1 of the drawing. By turning the set-screw *f*, the tube *b* is made to slide on the solid rod *c*, and the spindle I is lengthened or shortened according to the spot where the tool is to act. The guide-ways *e* of the head *d* move in a dove-tailed segmental groove, *i*, which forms a portion of a curve described in such a manner that in turning the swivel head the head *b* will be caused to move in the curved groove, and by moving said head *d* in the curved groove the swivel head *g* will be compelled to turn on its pivot without binding. The pivot *h* of the swivel head screws into a standard, *j*, which rises from a slotted plate, J, and another standard, *k'*, rising from the same plate, supports the curval groove *i* in which the carriage moves, which forms the guide-rest for the head *d*, as shown in fig. 2. The plate J is perforated with a cross-shaped slot, *k*, and it is secured to the table A by a screw, *l*, which passes through a T-shaped slot, *m*, in the table, and is fastened by a nut or in any other convenient manner. By the combined action of the slots *k* and *m* the plate J can be adjusted to any desirable position, and the tool can be readily brought to bear on the side or end of the article to be ornamented. The end of the solid part of the spindle I extends through the swivel head *g*, and bears the pulley *n* and a belt, *o*, extending from a fast-and-loose pulley, $p\,p^1$, over the pulley $n$ serves to impart motion to the spindle I and tool H. The pulleys $p\,p^1$ are mounted on a shaft, K, which has its bearings in the boxes $q\,q'\,q''$, a detached plan view of which is shown in fig. 4. The boxes $q\,q'$ are close together, and secured to a plate, $r$, which is fastened down to the floor by screws, $s$, passing through semicircular slots, $t$, so that by taking hold of the outer end of the shaft K, the boxes, together with the plate $r$, can be turned in either direction. The box $q''$, which supports the shaft K near its outer end, moves in semicircular guide-ways $u$, forming a portion of a circle described from the centre of the plate $r$, so that the several boxes $q\,q'\,q''$ will describe concentric circles when the shaft swings round the centre of said plate. A thumb-screw, $v$, passing through a flange projecting from the box $q''$ serves to fasten the latter and with it the shaft K in the desired position. By these means the shaft K can always be brought in the proper relation towards the shaft I which carries the tool. It must be remarked, however, that this arrangement can be altered, and various and different means can be employed to transmit the motion from the shaft K to the shaft I, such as cog-wheels and extension-rods with universal joints; and I do not wish to confine myself, therefore, to the precise mechanism shown in the drawings, but reserve the right to change the same as may be desirable. The shaft K derives its motion by means of a belt, $a^2$, from a pulley, $b^2$ on a shaft, $c^2$, which in the drawings is represented below the floor C, but which may be arranged in any other convenient position. Motion is imparted to the shaft by a belt, $d^2$, from a pulley, $e^2$, on the counter-shaft $f^2$, which has its bearings in suitable hangers under the table A, and to which motion is imparted by a belt, $g^2$, from the driving-shaft $h^2$. A belt, $i^2$, extending from a pulley, $j^2$, on the counter-shaft, imparts motion to the spindle of the rose engine.

The operation is as follows: The article to be ornamented is secured to the end of the spindle E in the ordinary manner, and after the engine has been adjusted according to the desired ornamentation, it is started. The tool, which rotates by means of the belts and pulleys hereinbefore specified, is brought in contact with the surface of the article to be ornamented, its position being regulated by the hand of the operator, which grasps the tool-holder and keeps the cutting edge of the tool up to the work with more or less force, according to the thickness or fineness of the lines or marks required. It will be noticed that this operation is just the reverse from the ordinary process of cutting or ornamenting glass, in which the operator holds the work in hand and presses it up against the tool, which revolves on a spindle in fixed bearings, and while in this ordinary process the regularity of the lines depends entirely upon the skill of the operator, in my process the work is attached to a spindle or chuck, to which a regular continuous or intermittent motion can be imparted, whereby perfect regularity of the lines or marks is insured.

What I claim as new, and desire to secure by Letters Patent, is—

1. Giving to the tool or cutter used in ornamenting articles of glass or other vitreous material a motion towards and from the work by hand at the will of the operator, while the work is secured to a movable spindle or carriage, in contradistinction to the ordinary process of cutting glass, in which the work is held in the hands of the operator and pressed against the cutter, which revolves in stationary bearings, substantially in the manner and for the purpose set forth.

2. The use of the rotating tool, in combination with the spindle of an ordinary rose engine or engine turning machine, either with a circular or with an up-and-down motion, substantially as and for the purpose described.

3. The adjustable head $d$, and swivel head $g$, in combination with the extension spindle I, carrying the tool H, all constructed and operating substantially as and for the purpose set forth.

4. The slotted plate J, carrying the bearing for the tool-spindle I, and arranged in combination with the slotted table A, in the manner and for the purpose substantially as described.

5. The swinging shaft K, arranged in combination with the adjustable tool-spindle I, in the manner and for the purpose substantially as set forth.

ANTON SCHWITTER.

Witnesses:
W. HAUFF,
G. BERG.